July 31, 1951        D. E. LEWIS        2,562,318
COMBINATION AGRICULTURAL IMPLEMENT
Filed Feb. 16, 1946
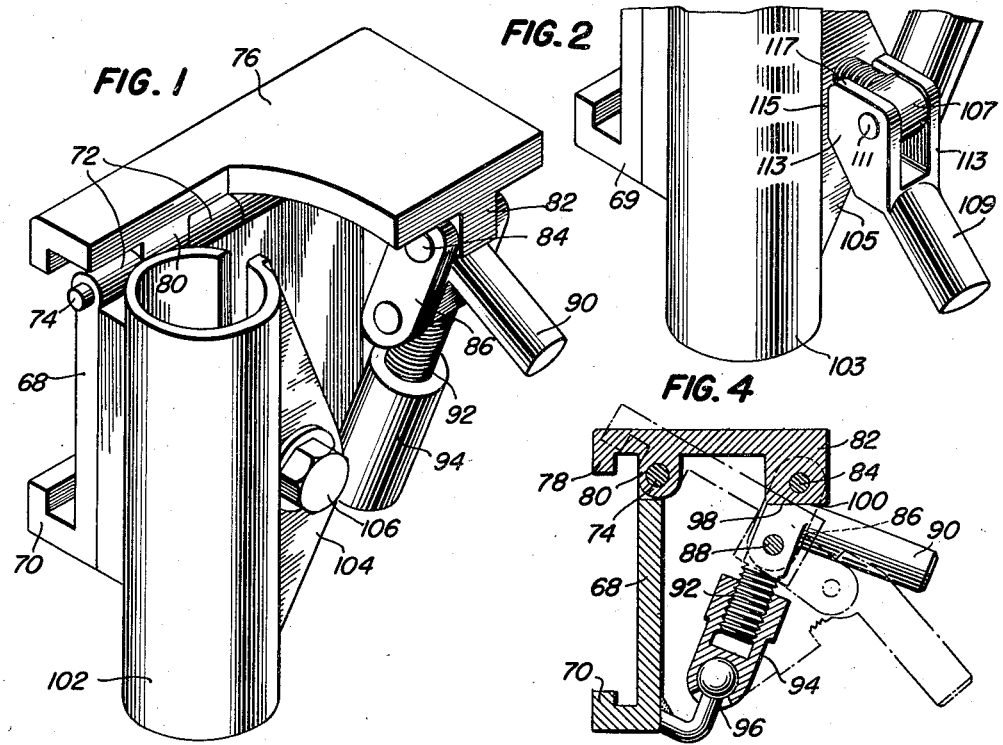
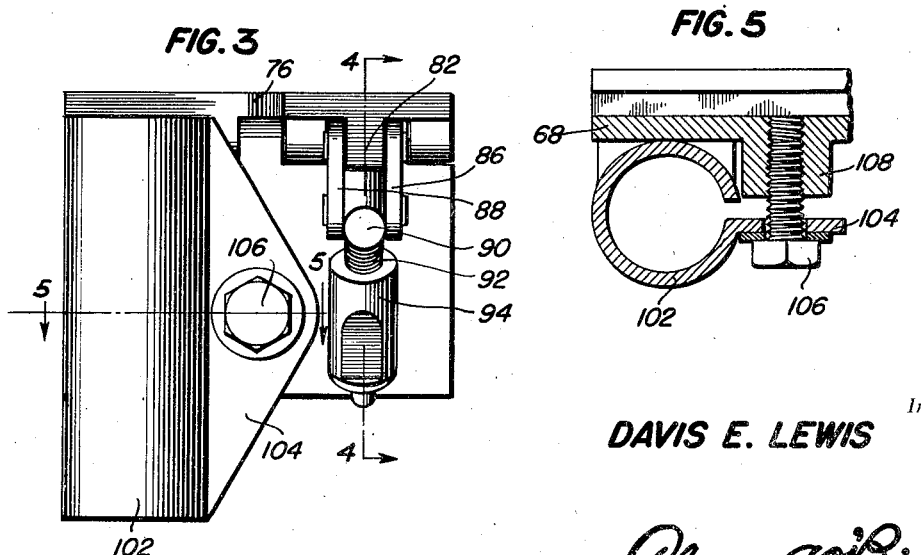
Inventor
DAVIS E. LEWIS Patented July 31, 1951

2,562,318

UNITED STATES PATENT OFFICE 2,562,318

COMBINATION AGRICULTURAL IMPLEMENT

Davis E. Lewis, Arcola, La.

Application February 16, 1946, Serial No. 648,107

5 Claims. (Cl. 97—198.1)

1

The present invention relates to a combination agricultural implement, and comprises an improvement upon the apparatus disclosed in my co-pending application Serial No. 613,587, filed August 30, 1945, now Patent No. 2,546,461, issued March 27, 1951.

More specifically, this improvement comprises a novel clamping means, tool carrying means and a more utilitarian mounting of the implements upon a tractor.

The primary object of my invention is to provide a novel and improved clamping device for expeditiously securing to and detaching agricultural implements from a tractor.

A second object of my invention is the development of a clamping device in accordance with the foregoing object, which is adaptable for use in a plurality of positions and with a variety of tool support bars.

A third object of my invention is the formulation of a clamping device in conformity with each of the aforementioned objects, which shall have a novel, highly effective gripping action and easier attachment and removal than the devices heretofore employed.

A fourth object of the invention is the provision of a clamping device as set forth in the previous objects which is provided with a tool support of novel, easier manipulated and greater gripping action.

A fifth object of the invention is the construction of a tool support means whereby a conventional tractor may be speedily adapted and employed for any type of ground working encountered on the farm.

The sixth object of my invention is the designing of a tractor tool support offering extremely flexible positioning of the tools in readily demountable and interchangeable relation.

The seventh object of my invention is the arranging of a tool carriage which is adapted for selective attachment to the rear or intermediate a tractor, in optional pushing or pulling relation and which is hydraulically actuated.

These and numerous other important objects of my invention which will subsequently appear as the following description proceeds, are attained by my invention, one embodiment of which has been illustrated by way of example only in the attached description, wherein:

Figure 1 is a perspective view of the novel tool holder;

Figure 2 is a perspective view of a modified form of tool holder;

Figure 3 is a front elevation of Figure 1;

2

Figure 4 is a vertical sectional view taken substantially upon the line 4—4 of Figure 3 and looking in the direction of the arrows; and Figure 5 is a horizontal sectional view taken substantially upon the line 5—5 of Figure 3 and looking in the direction of the arrows.

In my co-pending application is disclosed a tractor having a pair of frame members, adapted for single or combined use and each provided with a tool support bar, said frame members being interchangeably positioned in pushed or pulled relation to said tractor. In the present invention, I provide identical frame members for selective use either at the rear or front of the tractor, together with an improved tool support bar and a novel tool clamping means.

Attention is now directed to Figures 1, 3, 4 and 5, illustrating my improved clamp and tool holder. This consists of a generally rectangular base member 68 with its lower edge inturned at 70 to form a groove or flange, while its upper end is provided with a plurality of aligned bosses 72 axially bored to receive a hinge pin 74. A pivot plate 76 has a flanged rim 78 disposed parallel to the base flange 70 and is hinged by bored lugs 80 to the hinge pin 74. To one side and at the rear, plate 76 is formed with a depending boss 82, drilled to accommodate a pin 84 which journals a pair of shackles or links 86, carrying as by means of pin 88, a lever 90. A screw threaded rod 92 depends from the lever and adjustably engages the internally threaded sleeve 94 having its other end swiveled upon a ball seat 96 welded to the base member 68. At its upper portion, lever 90 is formed with a cam surface 98 engageable with the under surface 100 of the boss 82. The operation of the device as thus far described is as follows. Lever 90 is manipulated manually or by a short handle extension placed thereon and is pulled downwards and to the right as viewed in Figure 4, to break the toggle formed by the links 86 and the depending members 92 and 94, these parts now assuming the dotted line position of Figure 4, whereby the member 76 is pivoted clockwise upon its hinge pin, thereby releasing the flanges 70, 78 from their gripping engagement upon the flange of a tool support bar. When the clamp has been appropriately positioned upon said bar for optimum spacing of the tools, the said clamps may be secured to either the front or rear wall of bar 20 and in either upright or inverted position. The lever 90 is lifted to the full line position of Figure 4, thus straightening the toggle by aligning the links 86 and the members 92, 94 thus biasing the member 76 upwards and moving the clamps 78, 70 closer together. The range of movement of the jaws 70, 78 may be varied by adjusting the length of the members 94, 92. When the lever 90 is raised, the cam shoulder 98 thereon engages the abutment surface and applies the load of the clamp jaws directly from surface 100 to cam 98, pin 88, members 92, 94 and 96 to the base plate 68, thus relieving the links 86 and pin 84 from the load.

Suitably secured to the base member 68 as by welding or integral construction is a split collar or sleeve 102 having a flange portion 104 through which extends a suitable fastening means 106 engageable with a boss 108 on the base member 68 for tightening the sleeve upon the support rod of a tool.

Figure 2 discloses an alternative form of tightening means to replace the bolt 106 of Figures 1, 3, 4 and 5. As shown, a split sleeve 103 is attached to a base member 69 and carries a flange 105 all identical with the members shown in the form of Figure 5. However, the adjusting bolt 107 is provided with a handle 109 pivoted to the bolt head as at 111 whereby the bolt and sleeve may be tightened. The bolt 109 has a fiburcated end portion 113 which is pivoted upon pin 111 and embraces the bolt head, and is provided with cam surfaces 115 and idle or relieved portions 117, the former being engageable selectively with the flange 105. After the bolt has been tightened to the desired extent, cams 115 are engageable with the flange 105 to further tighten the sleeve upon the tool rod by depressing the handle 109 to engage the cams 115 with the flange.

Instead of employing the split sleeve tool support shown in the drawing, I may in some instances weld the tool support rod directly upon the base member 68 in place of the split sleeve, whereby the individual tools may be readily assembled and removed from various tool support bars, or even from other tractors.

I claim as my invention:

1. A tool support for tractors and the like comprising a vertically extending base plate having inner and outer faces and an inturned flange at the lower edge thereof extending laterally from the inner face, a further plate pivoted for vertical movement upon the upper edge of said base plate having inner and outer edges and an inturned flange extending laterally from the inner edge thereof, both of said flanges adapted to engage a tractor tool support bar, a vertically extending tool holder secured to the outer face of said base member, and actuating means interconnecting said base member and said further plate, said actuating means including a toggle mechanism pivoted to said outer face of said base member and to said further plate adjacent the outer edge of the latter, and means to make and break the toggle.

2. The combination of claim 1 wherein said outer edge of said further plate includes a cut-out portion located above said tool holder.

3. The combination of claim 2 wherein said tool holder includes a split tube and means deforming said split tube for clamping engagement with a tool shaft.

4. The combination of claim 1 wherein said toggle mechanism includes a boss carried at the outer edge of said further plate, a bearing surface on said boss, a pair of shackles pivoted to said boss on opposite sides thereof, a lever pivoted between said shackles and having a cam shoulder upon its upper surface in cooperative relation with said bearing surface, and a pivoted connection with said outer surface of said base member.

5. The combination of claim 4 wherein said pivoted connection includes a screw threaded rod depending from said lever and an internally threaded sleeve pivoted to the outer surface of said base member and adjustably receiving said threaded rod.

DAVIS E. LEWIS.

REFERENCES CITED

The following references are of record in the file of this patent:

UNITED STATES PATENTS

| Number | Name | Date |
|---|---|---|
| 28,382 | Lamb | May 22, 1860 |
| 528,926 | Davis | Nov. 13, 1894 |
| 1,031,607 | Yeatts | July 2, 1912 |
| 1,251,096 | Paul | Dec. 25, 1917 |
| 1,421,065 | Callan | June 27, 1922 |
| 1,544,750 | Hawkins | July 7, 1925 |
| 1,952,605 | Pearson | Mar. 27, 1934 |
| 2,029,249 | Noell et al. | Jan. 28, 1936 |
| 2,150,665 | Tuft | Mar. 14, 1939 |
| 2,335,156 | McMahon | Nov. 23, 1943 |
| 2,372,403 | Swanson | Mar. 27, 1945 |

FOREIGN PATENTS

| Number | Country | Date |
|---|---|---|
| 687,554 | Germany | Feb. 1, 1940 |